United States Patent
Ha et al.

(10) Patent No.: US 12,472,221 B2
(45) Date of Patent: Nov. 18, 2025

(54) COMPOSITION FOR INHIBITING OSTEOCLASTS CONTAINING AGASTACHE RUGOSA EXTRACT AS ACTIVE INGREDIENT, AND USE THEREOF

(71) Applicant: Korea Institute of Oriental Medicine, Daejeon (KR)

(72) Inventors: Hyun Il Ha, Daejeon (KR); Tae Soo Kim, Daejeon (KR); Youn Hwan Hwang, Daejeon (KR); Seon A Jang, Seoul (KR)

(73) Assignee: Korea Institute of Oriental Medicine, Daejeon (KR)

( * ) Notice: Subject to any disclaimer, the term of this patent is extended or adjusted under 35 U.S.C. 154(b) by 1031 days.

(21) Appl. No.: 17/613,664

(22) PCT Filed: Apr. 29, 2020

(86) PCT No.: PCT/KR2020/005660
§ 371 (c)(1),
(2) Date: Jun. 15, 2022

(87) PCT Pub. No.: WO2020/235828
PCT Pub. Date: Nov. 26, 2020

(65) Prior Publication Data
US 2022/0323530 A1    Oct. 13, 2022

(30) Foreign Application Priority Data

May 23, 2019   (KR) .......................... 10-2019-0060480

(51) Int. Cl.
*A61K 36/00*     (2006.01)
*A61K 31/7048*   (2006.01)
*A61K 36/532*    (2006.01)
*A61P 19/08*     (2006.01)

(52) U.S. Cl.
CPC ........ *A61K 36/532* (2013.01); *A61K 31/7048* (2013.01); *A61P 19/08* (2018.01); *A61K 2236/331* (2013.01); *A61K 2236/37* (2013.01)

(58) Field of Classification Search
CPC .................................................. A61K 36/532
See application file for complete search history.

(56) References Cited

U.S. PATENT DOCUMENTS

2004/0071792 A1 *   4/2004   Lee .................... A61P 29/00
                                                    424/725

FOREIGN PATENT DOCUMENTS

| KR | 2003/0031418 A | 4/2003 | |
|----|----------------|--------|--|
| KR | 2011/0051162 A | 5/2011 | |
| KR | 2016/0016127 A | 2/2016 | |
| KR | 2017/0001025 A | 1/2017 | |
| WO | WO-2008048044 A1 * | 4/2008 | ........... A61K 36/532 |

OTHER PUBLICATIONS

International Search Report dated Aug. 10, 2020, issued in corresponding International Patent Application No. PCT/KR2020/005660.

Nam-Kyung Im et al., 'Effects of Medicinal Herb Extracts on Osteoblast Differentiation and Osteoclast Formation' *Korean Journal of Food Science and Technology*, vol. 42, No. 5, 2010, pp. 637-642.

* cited by examiner

Primary Examiner — Qiuwen Mi
(74) Attorney, Agent, or Firm — Harness, Dickey & Pierce, P.L.C.

(57) ABSTRACT

The *Agastache rugosa* extract or the isoagastachoside or crude polysaccharide fraction included in the extract according to the present invention can be prepared based on plants being domestically cultivated, and thus is advantageous in terms of time and cost, and can effectively inhibit the differentiation, growth, and bone resorption functions of osteoclast progenitor cells, thus increasing bone density and the like, and accordingly, can be effectively used for the prevention, amelioration, or treatment of diseases related to bone loss caused by differentiation into osteoclasts or excessive activity of osteoclasts. In addition, the active ingredient, which is a plant-derived natural substance, is safe due to fewer side effects on the human body compared to chemical drugs, and inhibits osteoclast progenitor cells independently of estrogen, and thus can be widely used in osteoporosis occurring due to various causes other than menopause.

5 Claims, 10 Drawing Sheets

COMPOSITION FOR INHIBITING OSTEOCLASTS CONTAINING AGASTACHE RUGOSA EXTRACT AS ACTIVE INGREDIENT, AND USE THEREOF

CROSS-REFERENCE TO RELATED APPLICATIONS

This application is a national phase under 35 U.S.C. § 371 of PCT International Application No. PCT/KR2020/005660 which has an International filing date of Apr. 29, 2020, which claims priority to Korean Application No. 10-2019-0060480, filed May 23, 2019, the entire contents of each of which are hereby incorporated by reference.

TECHNICAL FIELD

The present invention relates to a composition for the prevention, amelioration, or treatment of diseases related to bone loss caused by osteoclasts, the composition containing, as an active ingredient, an *Agastache rugosa* extract or an isoagastachoside or crude polysaccharide fraction included in the extract.

Also, the present invention relates to a composition for inhibiting bone loss caused by osteoclasts or a composition for inhibiting the differentiation of osteoclast progenitor cells into osteoclasts, the composition containing, as an active ingredient, an *Agastache rugosa* extract or an isoagastachoside or crude polysaccharide fraction included in the extract.

In addition, the present invention relates to a method for preventing, ameliorating, or treating diseases related to bone loss caused by osteoclasts, the method including administering an *Agastache rugosa* extract or an isoagastachoside or crude polysaccharide fraction included in the extract to a patient with a disease related to bone loss caused by osteoclasts.

BACKGROUND

In the case of adults who have finished growing, about 10-30% of their bones each year maintain a balance by dynamically and constantly repeating the process of formation and resorption in which old bones are removed and replaced with new bones until the day they die. This is called bone remodeling, and it is essential to restore the microscopic damage to the bone caused by growth and stress and to properly maintain the function of the bone.

It is known that two types of cells are largely involved in bone remodeling, one is osteoblasts that generate bones, and the other is osteoclasts that destroy bones. Resorption or destruction of old bone is accomplished by osteoclasts, which puncture the bone and release a small amount of calcium into the bloodstream, which is used to maintain body functions. Osteoblasts fill the pores with collagen and cover with calcium and phosphorus deposits (hydroxyapatite) to form new, hard bones and rebuild the skeleton. Bone density can be maintained as before only when the osteoclast and osteoblast rates are the same, and a balance is always maintained between the amount of bone resorption and the amount of bone formation in normal adults. When the balance of these important bones is broken, many diseases can be caused, and these diseases are called bone diseases.

Osteoporosis, which is emerging as a major problem in the aging society among bone diseases, is a disease that can easily cause fractures even with a slight impact due to a decrease in the amount of bone in a unit volume without significant change in the chemical composition of the bone. It is known that the incidence is highest in the elderly, especially in postmenopausal women, due to insufficient secretion of estrogen. Currently, studies have been reported that estrogen or plant-derived phytoestrogens that exist in nature and exhibit weak estrogenic activity are very useful for the prevention of postmenopausal osteoporosis. However, this method has a limitation in that it is limitedly used for causes other than menopausal osteoporosis. Accordingly, calcium supplements such as calcium salt, bovine bone powder, and vitamin D metabolite therapy have been used to treat non-menopausal osteoporosis, but they have problems in terms of solubility, absorption, and taste.

In addition, bisphosphonate or calcitonin preparations are used for drug administration and are known to be effective in the treatment of osteoporosis, but these drugs are prescription drugs, and have side effects such as tinnitus, headache, loss of appetite, or narrowing of the esophagus, requiring extreme caution when taking it.

*Agastache rugosa* discussed herein refers to the dried above-ground part of *Agastache rugosa*, and is also called 'bang-at-ip', 'baechohyang', or 'togwakhyang' in Korean depending on the region. *Agastache rugosa* is also used as a spice to get rid of the fishy smell, and according to 「Donguiboga 」, it was mainly used when the body swells due to the change of water and food when traveling away from home. In addition, it was used to stop vomiting and relieve symptoms caused by receiving cold energy. In clinical practice, it is used to treat cold-caused headache, tight feeling in the chest, loss of appetite, nausea, vomiting, diarrhea, and bad breath. However, the effect of an *Agastache rugosa* extract or an isoagastachoside or crude polysaccharide fraction included in the extract on bone loss-related diseases or osteoclasts has not been studied or disclosed.

The above information disclosed in this Background section is only for enhancement of understanding of the background of the invention and it may therefore contain information that does not form the prior art that is already known to a person of ordinary skill in the art.

SUMMARY

Technical Problem

Accordingly, the present inventors have made intensive efforts to provide a plant extract material that can be effectively used for bone diseases having causes other than menopause while having the effect of preventing, ameliorating, or treating bone diseases such as osteoporosis, and as a result, have found that extract of *Agastache rugosa* or isoagastachoside or crude polysaccharide fraction contained in the *Agastache rugosa* extract has the effect of inhibiting osteoclasts, which occurs independently of estrogen, and completed the present invention.

Accordingly, the present invention is directed to providing a composition for the prevention, amelioration, or treatment of diseases related to bone loss caused by osteoclasts, the composition containing, as an active ingredient, an *Agastache rugosa* extract or an isoagastachoside or crude polysaccharide fraction included in the extract.

In addition, the present invention is directed to providing a composition for inhibiting bone loss caused by osteoclasts or a composition for inhibiting the differentiation of osteoclast progenitor cells into osteoclasts, the composition containing, as an active ingredient, an *Agastache rugosa* extract or an isoagastachoside or crude polysaccharide fraction included in the extract.

Technical Solution

The present invention provides a composition for preventing, ameliorating or treating diseases related to bone loss caused by osteoclasts, the composition containing an *Agastache rugosa* extract as an active ingredient.

According to a preferred embodiment of the present invention, the *Agastache rugosa* extract may be isoagastachoside or crude polysaccharide fraction contained in the *Agastache rugosa* extract.

According to a preferred embodiment of the present invention, the *Agastache rugosa* extract may be extracted from any one or more selected from the group consisting of leaves, stems, flowers and fruits of *Agastache rugosa*.

According to a preferred embodiment of the present invention, the *Agastache rugosa* extract may be extracted using as a solvent any one or more selected from the group consisting of water, an organic solvent, and a mixture thereof.

According to a preferred embodiment of the present invention, the *Agastache rugosa* extract may be extracted by any one or more extraction methods selected from the group consisting of reduced pressure high temperature extraction, boiling water extraction, reflux extraction, hot water extraction, cold extraction, room temperature extraction, ultrasonic extraction, or vapor extraction.

According to a preferred embodiment of the present invention, the molecular weight of the crude polysaccharide fraction may be 1 to 300 kDa.

According to a preferred embodiment of the present invention, the composition may inhibit the differentiation into osteoclasts or the activity of osteoclasts.

According to a preferred embodiment of the present invention, the disease related to bone loss may be any one or more selected from the group consisting of osteoporosis, Pajet's disease of bone, rickets, osteomalacia, renal osteodystrophy in patients with renal failure, rheumatoid bone disease, degenerative bone disease, bone metastatic lesion, and a primary bone tumor.

The present invention also provides a composition for inhibiting bone loss caused by osteoclasts, the composition containing an *Agastache rugosa* extract as an active ingredient.

According to a preferred embodiment of the present invention, the *Agastache rugosa* extract may be isoagastachoside or crude polysaccharide fraction contained in the *Agastache rugosa* extract.

According to a preferred embodiment of the present invention, the composition may inhibit the differentiation into osteoclasts or the activity of osteoclasts.

The present invention also provides a composition for inhibiting the differentiation of osteoclast progenitor cells into osteoclasts, the composition containing an *Agastache rugosa* extract as an active ingredient.

According to a preferred embodiment of the present invention, the *Agastache rugosa* extract may be isoagastachoside or crude polysaccharide fraction contained in the *Agastache rugosa* extract.

The present invention also provides a method for preventing or treating diseases related to bone loss caused by osteoclasts, the method including administering an *Agastache rugosa* extract to a patient with a disease related to bone loss caused by osteoclasts.

According to a preferred embodiment of the present invention, the *Agastache rugosa* extract may be isoagastachoside or crude polysaccharide fraction contained in the *Agastache rugosa* extract.

As described above, chemical drugs used for the treatment of bone diseases such as osteoporosis in the related art have problems in that various side effects exist and efficacy is insignificant. As an alternative to this, compositions for osteoporosis using natural estrogen such as phytoestrogens have been studied, but there is a limitation in that they are used only for osteoporosis caused by menopause. *Agastache rugosa* is mainly used as a spice, and it is known that it can be used as a folk remedy for headaches or the like, but the effect on osteoclasts has not been disclosed.

The composition containing an *Agastache rugosa* extract or an isoagastachoside or crude polysaccharide fraction included in the extract according to the present invention can effectively inhibit the differentiation, growth, and bone resorption functions of osteoclast progenitor cells, and the inhibitory effect may occur independently of estrogen and can improve bone density. Therefore, the composition of the present invention is effective as a composition for preventing, ameliorating or treating bone diseases such as osteoporosis caused by osteoclasts by inhibiting osteoclasts, and may be provided as a composition for inhibiting bone loss caused by osteoclasts or as a composition inhibiting differentiation of osteoclast progenitor cells into osteoclasts.

The hot water reflux extract or ethanol reflux extract of *Agastache rugosa* has the effect of inhibiting the differentiation of bone marrow cell-derived macrophages into osteoclasts (Example 3), which occurs independently of the viability of bone marrow cell-derived macrophages (Example 4). In addition, since the hot water reflux extract of *Agastache rugosa* had the effect of inhibiting the bone resorption capacity of osteoclasts (Example 5), it can provide an effect of improving bone density.

It was confirmed that even isoagastachoside or polysaccharide fraction contained in the hot water reflux extract of *Agastache rugosa* had an effect of inhibiting the differentiation of bone marrow cell-derived macrophages into osteoclasts (Examples <3-2> and <3-3>). This may mean that the osteoclast differentiation inhibitory effect of the hot water reflux extract of *Agastache rugosa*, especially the hot water reflux extract of *Agastache rugosa* is due to the isoagastachoside or (crude) polysaccharide fraction, and furthermore, if at the same concentration, it may mean that the isoagastachoside or (crude) polysaccharide fraction can provide a significantly higher osteoclast differentiation inhibitory effect compared to the hot water extract of *Agastache rugosa*.

Among the symptoms of menopause, weight gain is caused by an increase in adipose tissue due to an increase in blood cholesterol as the conversion rate of cholesterol to estrogen in the body decreases due to hormonal imbalance or the like after menopause, so it is different from general metabolic diseases caused by excessive energy intake or low energy consumption. In addition, when the ovaries are resected, female hormones such as estrogen are insufficient, resulting in atrophy of the uterus and consequently the weight of the uterus is reduced. In the present invention, when the hot water reflux extract of *Agastache rugosa* was orally administered to a mouse model induced to decrease estrogen by ovarian resection, it inhibited weight gain in mice and had no effect on uterine atrophy, whereas there was an effect of inhibiting the decrease in the bone volume, trabecular bone thickness, and trabecular bone count of the mice (Example 6).

Therefore, the present invention may provide a health functional food composition for preventing or ameliorating a disease related to bone loss, the composition containing an *Agastache rugosa* extract as an active ingredient.

The *Agastache rugosa* extract of the present invention may be isoagastachoside or crude polysaccharide fraction contained in the *Agastache rugosa* extract.

The *Agastache rugosa* extract is preferably extracted from any one or more selected from the group consisting of leaves, stems, flowers and fruits of *Agastache rugosa*, but it is not limited thereto.

The *Agastache rugosa* extract of the present invention may be extracted using a solvent commonly used in the art, but may be extracted using as a solvent any one or more selected from the group consisting of: preferably water, an organic solvent, and a mixture thereof; more preferably water, $C_1$ to $C_4$ lower alcohol, and a mixture thereof; and most preferably water, methanol, ethanol or propanol. The water extract of *Agastache rugosa* may have a significantly higher inhibitory effect on osteoclast differentiation than the ethanol extract of *Agastache rugosa*, and may have no effect on the survival of osteoclasts. On the other hand, the ethanol extract of *Agastache rugosa* may inhibit the survival of osteoclasts at a concentration of 100 μg/ml or more.

The *Agastache rugosa* extract of the present invention may be extracted using an extraction method commonly used in the art, but may be preferably extracted by any one or more extraction methods selected from the group consisting of reduced pressure high temperature extraction, boiling water extraction, reflux extraction, hot water extraction, cold extraction, room temperature extraction, ultrasonic extraction, or vapor extraction.

The molecular weight of the crude polysaccharide fraction of the present invention may be 1 kDa to 300 kDa. It is preferably 3 kDa to 300 kDa, more preferably 10 kDa to 300 kDa, and still more preferably 100 kDa to less than 300 kDa.

The disease related to bone loss of the present invention may be any disease caused by osteoclasts without limitation, but is preferably any one or more selected from the group consisting of osteoporosis, Pajet's disease of bone, rickets, osteomalacia, renal osteodystrophy in patients with renal failure, rheumatoid bone disease, degenerative bone disease, bone metastatic lesion, and a primary bone tumor.

As a result, the health functional food composition of the present invention can prevent or ameliorate bone loss-related diseases caused by osteoclasts by inhibiting the differentiation of osteoclasts, that is, the differentiation of osteoclast progenitor cells into osteoclasts or the activity of osteoclasts.

The health functional food composition according to the present invention may be prepared in various forms according to conventional methods known in the art. It may be prepared as regular food by adding the *Agastache rugosa* extract of the present invention to the following food including, but not limited to, beverages (including alcoholic beverages), fruits and their processed foods (e.g., canned fruit, bottled, jam, marmalade, etc.), fish, meat and their processed foods (e.g., ham, sausages, corn beef, etc.), breads and noodles (e.g., udon noodles, soba noodles, ramen, spaghetti, macaroni, etc.), fruit juice, various drinks, cookies, yeot (Korean hard taffy), dairy products (e.g., butter, cheese, etc.), edible vegetable oils and fats, margarine, vegetable protein, retort food, frozen food, various seasonings (e.g., soybean paste, soy sauce, sauce, etc.). In addition, it may be prepared as a nutritional supplement by adding the *Agastache rugosa* extract of the present invention to capsules, tablets, pills, and the like, but it is not limited thereto.

In addition, as a health functional food, the *Agastache rugosa* extract of the present invention itself may be prepared in the form of tea, juice, and drink and ingested by liquefaction, granulation, encapsulation, and powder so that it can be drinkable (as health drink), but it is not limited thereto. In addition, in order to use the *Agastache rugosa* extract of the present invention in the form of a food additive, it may be prepared and used in the form of a powder or a concentrate. In addition, it can be prepared in the form of a composition by mixing the *Agastache rugosa* extract of the present invention with an active ingredient known to be effective in preventing and ameliorating bone loss-related diseases.

When the *Agastache rugosa* extract of the present invention is used as a health drink composition, the health drink composition may contain various flavoring agents or natural carbohydrates as additional ingredients, like a conventional drink. The above-mentioned natural carbohydrates may be monosaccharides such as glucose and fructose; disaccharides such as maltose and sucrose; polysaccharides such as dextrin and cyclodextrin; or sugar alcohols such as xylitol, sorbitol, and erythritol. As sweetening agents, natural sweetening agents such as taumatine and stevia extract, synthetic sweetening agents such as saccharin and aspartame, or the like may be used. The proportion of the natural carbohydrate is generally about 0.01 to 0.04 g, preferably about 0.02 to 0.03 g per 100 mL of the composition of the present invention.

In addition, the *Agastache rugosa* extract of the present invention may be contained as an active ingredient in a food composition for preventing or ameliorating bone loss-related diseases, and the amount is not particularly limited to an amount effective to achieve the effect of preventing and ameliorating bone loss-related diseases, but is preferably 0.01 to 100% by weight based on the total weight of the composition. The food composition of the present invention may be prepared by mixing the *Agastache rugosa* extract with other active ingredients known to be effective in the composition for preventing or ameliorating bone loss-related diseases.

In addition to the above, the health functional food of the present invention may contain various nutritional supplements, vitamins, electrolytes, flavoring agents, coloring agents, pectic acid, pectic acid salts, alginic acid, alginic acid salts, organic acids, protective colloidal thickeners, pH regulators, stabilizers, preservatives, glycerin, alcohols, or carbonating agents, and the like. In addition, the health food of the present invention may contain fruit flesh for the production of natural fruit juice, fruit juice beverage, or vegetable beverage. These ingredients may be used independently or in combination. The proportion of these additives is generally selected in the range of 0.01 to 0.1 parts by weight per 100 parts by weight of the composition of the present invention.

In addition, the present invention may provide a pharmaceutical composition for preventing or ameliorating diseases related to bone loss, the composition containing an *Agastache rugosa* extract as an active ingredient.

The *Agastache rugosa* extract of the present invention may be isoagastachoside or crude polysaccharide fraction contained in the *Agastache rugosa* extract. Since the *Agastache rugosa* extract is the same as that used in the health functional food composition, the description is replaced with the description thereof.

The disease related to bone loss of the present invention may be any disease caused by osteoclasts without limitation, but is preferably any one or more selected from the group consisting of osteoporosis, Pajet's disease of bone, rickets, osteomalacia, renal osteodystrophy in patients with renal failure, rheumatoid bone disease, degenerative bone disease, bone metastatic lesion, and a primary bone tumor.

As a result, the pharmaceutical composition of the present invention can prevent or treat bone loss-related diseases caused by osteoclasts by inhibiting the differentiation of osteoclasts, that is, the differentiation of osteoclast progenitor cells into osteoclasts or the activity of osteoclasts.

The pharmaceutical composition of the present invention may be in various oral or parenteral formulations. When formulating the composition, it may be prepared using one or more buffers (e.g., saline or PBS), antioxidants, bacteriostatic agents, chelating agents (e.g., EDTA or glutathione), fillers, extending agents, binding agents, adjuvants (e.g., aluminum hydroxide), suspending agents, thickening agents, wetting agents, disintegrating agents or surfactants, diluents or excipients.

Solid formulations for oral administration include tablets, pills, powders, granules, or capsules, etc., and such solid formulations may be prepared by mixing one or more compounds with at least one or more excipients, for example, starch (including corn starch, wheat starch, rice starch, potato starch, etc.), calcium carbonate, sucrose, lactose, dextrose, sorbitol, mannitol, xylitol, erythritol, maltitol, cellulose, methyl cellulose, sodium carboxymethyl cellulose and hydroxypropylmethyl-cellulose or gelatin, etc. For example, tablets or sugar-coated tablets may be obtained by blending the active ingredient with solid excipients, grinding them, adding suitable adjuvants, and processing them into a granular mixture.

In addition to simple excipients, lubricants such as magnesium stearate and talc are also used. Liquid formulations for oral administration may include suspensions, internal liquid formulations, emulsions, or syrups, and various excipients, such as wetting agents, sweetening agents, air fresheners, or preservatives in addition to water or liquid paraffin, which are commonly used simple diluents. In addition, in some cases, cross-linked polyvinylpyrrolidone, agar, alginic acid or sodium alginate may be added as a disintegrating agent, and an anti-aggregating agent, a lubricant, a wetting agent, a flavoring agent, an emulsifier, and a preservative may be additionally included.

Formulations for parenteral administration include sterile aqueous solutions, non-aqueous solutions, suspension solutions, emulsions, lyophilized formulations, or suppositories. Non-aqueous solutions and suspension solutions may include propylene glycol, polyethylene glycol, vegetable oils such as olive oil, and injectable esters such as ethyl oleate. As the base of the suppository, witepsol, macrogol, tween 61, cacao butter, laurinum, glycerol, gelatin, etc. may be used.

The composition of the present invention may be administered orally or parenterally, and for parenteral administration, it may be formulated according to a method known in the art in the form of external applications for skin; intraperitoneal, rectal, intravenous, intramuscular, subcutaneous, intrauterine dural or intracerebrovascular injections; transdermal administration agents; or nasal inhalants.

In the case of the injection, it must be sterilized and protected from contamination of microorganisms such as bacteria and fungi. Examples of suitable carriers for injection may include, but are not limited to, water, ethanol, polyol (e.g., glycerol, propylene glycol and liquid polyethylene glycol, etc.), mixtures thereof and/or a solvent or dispersion medium containing vegetable oil. More preferably, suitable carriers may include Hanks' solution, Ringer solution, phosphate buffered saline (PBS) with triethanolamine or isotonic solutions such as sterile water for injection, 10% ethanol, 40% propylene glycol and 5% dextrose, etc. In order to protect the injection from microbial contamination, it may further include various antibacterial and antifungal agents such as parabens, chlorobutanol, phenol, sorbic acid, thimerosal, and the like. In addition, in most cases, the injection may further include an isotonic agent such as sugar or sodium chloride.

In the case of transdermal administration agent, forms such as ointment, cream, lotion, gel, external solution, pasta, liniment, and air roll are included. In the above, transdermal administration means that an effective amount of the active ingredient contained in the pharmaceutical composition is delivered into the skin by topically administering the pharmaceutical composition to the skin.

In the case of inhalant, the compounds for use according to the present invention may be conveniently delivered in the form of an aerosol spray from pressurized packs or nebulizers using a suitable propellant, for example, dichlorofluoromethane, trichlorofluoromethane, dichlorotetrafluoroethane, carbon dioxide or other suitable gas. In the case of a pressurized aerosol, the dosage unit may be determined by providing a valve to deliver a metered amount. For example, gelatin capsules and cartridges for use in inhalers or insufflators may be formulated to contain a compound and a suitable powder base powder mixture such as lactose or starch.

The composition of the present invention is administered in a pharmaceutically effective amount. The pharmaceutically effective amount means an amount sufficient to treat a disease with a reasonable benefit/risk ratio applicable to medical treatment, and the effective dose level may be determined depending on the patient's disease type, severity, drug activity, drug sensitivity, administration time, administration route and excretion rate, duration of treatment, factors including concomitant drugs, and other factors well known in the medical field. The composition of the present invention may be administered as an individual therapeutic agent or in combination with other therapeutic agents, may be administered sequentially or simultaneously with conventional therapeutic agents, and may be administered single or multiple. That is, the total effective amount of the composition of the present invention may be administered to a patient as a single dose, and may be administered by a fractionated treatment protocol in which multiple doses are administered for a long period of time. In consideration of all of the above factors, it is important to administer an amount that can obtain the maximum effect with a minimum amount without side effects, which can be easily determined by those skilled in the art.

The range of dosage of the pharmaceutical composition of the present invention varies depending on the patient's weight, age, sex, health status, diet, administration time, administration method, excretion rate and severity of disease. As a daily dose, it may be administered in one to several divided doses so as to be administered in an amount of preferably 0.01 to 50 mg, more preferably 0.1 to 30 mg per 1 kg of body weight per day, based on the *Agastache rugosa* extract when administered parenterally, and in an amount of preferably 0.01 to 100 mg, more preferably 0.01 to 10 mg per 1 kg of body weight per day, based on the *Agastache rugosa* extract when administered orally. However, since it may increase or decrease depending on the route of administration, the severity of disease, sex, weight, age, etc., the dosage is not intended to limit the scope of the present invention in any way.

The composition of the present invention may be used alone or in combination with methods using surgery, radiation therapy, hormone therapy, chemotherapy, and biological response modifiers.

The pharmaceutical composition of the present invention may also be provided in the form of an external application containing an *Agastache rugosa* extract as an active ingredient. When the pharmaceutical composition for preventing and treating bone loss-related diseases of the present invention is used for external applications for skin, it may further contain adjuvants commonly used in the field of dermatology, such as any other ingredients commonly used for external applications for skin including fatty substance, organic solvent, solubilizer, thickening and gelling agent, emollient, antioxidant, suspending agent, stabilizer, foaming agent, air freshener, surfactant, water, ionic emulsifier, nonionic emulsifier, filler, sequestering agent, chelating agent, preservative, vitamin, blocking agent, wetting agent, essential oil, dye, pigment, hydrophilic active agent, lipophilic active agent or lipid vesicle. In addition, the above ingredients may be introduced in an amount generally used in the field of dermatology.

When the pharmaceutical composition for preventing and treating bone loss-related diseases of the present invention is provided as an external application for skin, it may be in the form of, but not limited to, ointment, patch, gel, cream or spray.

In addition, the present invention may provide a composition for inhibiting bone loss caused by osteoclasts, the composition containing an *Agastache rugosa* extract as an active ingredient.

The *Agastache rugosa* extract of the present invention may be isoagastachoside or crude polysaccharide fraction contained in the *Agastache rugosa* extract. Since the *Agastache rugosa* extract is the same as that used in the health functional food composition, the description is replaced with the description thereof.

The bone loss of the present invention is preferably caused by bone resorption by osteoclasts rather than estrogen, and the composition may be a food composition, a quasi-drug composition, or a cosmetic composition, but is not limited thereto.

As a result, the composition of the present invention can inhibit bone loss caused by osteoclasts by inhibiting the differentiation of osteoclasts, that is, the differentiation of osteoclast progenitor cells into osteoclasts or the activity of osteoclasts.

In addition, the present invention may provide a composition for inhibiting the differentiation of osteoclast progenitor cells into osteoclasts, the composition containing an *Agastache rugosa* extract as an active ingredient.

The *Agastache rugosa* extract of the present invention may be isoagastachoside or crude polysaccharide fraction contained in the *Agastache rugosa* extract. Since the *Agastache rugosa* extract is the same as that used in the health functional food composition, the description is replaced with the description thereof.

The compositions of the present invention may be used in vitro.

In addition, the present invention may provide a method for preventing or treating diseases related to bone loss caused by osteoclasts, the method including administering an *Agastache rugosa* extract to a patient with a disease related to bone loss caused by osteoclasts.

The *Agastache rugosa* extract of the present invention may be isoagastachoside or crude polysaccharide fraction contained in the *Agastache rugosa* extract. Since the *Agastache rugosa* extract is the same as that used in the health functional food composition, the description is replaced with the description thereof.

The disease related to bone loss of the present invention may be any disease caused by osteoclasts without limitation, but is preferably any one or more selected from the group consisting of osteoporosis, Pajet's disease of bone, rickets, osteomalacia, renal osteodystrophy in patients with renal failure, rheumatoid bone disease, degenerative bone disease, bone metastatic lesion, and a primary bone tumor.

As a result, the method for preventing or treating of the present invention can prevent or treat bone loss-related diseases caused by osteoclasts by inhibiting the differentiation of osteoclasts, that is, the differentiation of osteoclast progenitor cells into osteoclasts or the activity of osteoclasts.

Advantageous Effects

The *Agastache rugosa* extract or the isoagastachoside or crude polysaccharide fraction included in the extract according to the present invention can be prepared based on plants being domestically cultivated, and thus is advantageous in terms of time and cost, and can effectively inhibit the differentiation, growth, and bone resorption functions of osteoclast progenitor cells, thus increasing bone density and the like, and accordingly, can be effectively used for the prevention, amelioration, or treatment of diseases related to bone loss caused by differentiation into osteoclasts or excessive activity of osteoclasts. In addition, the active ingredient, which is a plant-derived natural substance, is safe due to fewer side effects on the human body compared to chemical drugs, and has the effect of inhibiting osteoclast progenitor cells independently of estrogen, and thus can be widely used in osteoporosis occurring due to various causes other than menopause.

BRIEF DESCRIPTION OF THE DRAWINGS

The above and other aspects, features, and advantages of the present invention will become more apparent to those of ordinary skill in the art by describing embodiments thereof in detail with reference to the accompanying drawings, in which.

DETAILED DESCRIPTION OF THE EMBODIMENTS

Example 1

Preparation of *Agastache rugosa* Extract

<1-1> Preparation of *Agastache rugosa* Extract

For hot water extract of *Agastache rugosa* (WEAR), 500 g of *Agastache rugosa* added to 3.5 L of distilled water, extracted under reflux for 3 hours (heating mantle), filtered through a qualitative filter paper (Φ185 mm), and freeze-dried. In cell experiments, the hot water extract of *Agastache rugosa* (WEAR) dissolved in distilled water was filtered through a 0.22 μℓ filter and then used for the experiment. In animal experiments, the freeze-dried extract was dissolved in sterile water for injection and used.

For ethanol extract of *Agastache rugosa* (EEAR), 500 g of *Agastache rugosa* was added to 3.5 L of 70% ethanol, extracted under reflux (heating mantle) for 3 hours, filtered through a qualitative filter paper (Φ185 mm), concentrated with a rotary evaporator, and then freeze-dried. After dissolving in dimethyl sulfoxide, ethanol extract of *Agastache rugosa* (EEAR) was used for the experiment.

<1-2> Preparation of (Crude) Polysaccharide Fraction

To prepare a polysaccharide fraction from the hot water extract of *Agastache rugosa* (WEAR) prepared in Example <1-1>, 4 times the volume of ethanol was added to the WEAR and precipitated with 80% ethanol. The precipitated polysaccharide was recovered and polysaccharide fractions having a molecular weight of 10 kDa or more were obtained using a permeable membrane (Amicon Ultra-15 10 k). The obtained fractions were dried using a Genevac EZ-2 plus Evaporating system, and the polysaccharide fractions (WEAR-PS) dissolved in distilled water were filtered through a 0.22 μℓ filter and then used for the experiment.

Additionally, when performing 80% ethanol precipitation for WEAR, a precipitated crude polysaccharide fraction (WEAR-PO) and a non-precipitated fraction (WEAR-ED) are obtained, freeze-dried, dissolved in distilled water, filtered with a 0.22 μℓ filter, and then used for the experiment. In addition, the WEAR-PO was passed through a filtration membrane having a molecular weight cut-off of 3, 10, 30, 100, 300 and 1000 kDa to obtain a crude polysaccharide fraction that did not pass (P0-3 kDA Fx, P0-10 kDA Fx, P0-30 kDA Fx, P0-100 kDA Fx, P0-300 kDA Fx, P0-1000 kDA Fx), freeze-dried, dissolved in distilled water, filtered through a 0.22 μℓ, and then used for the experiment.

Example 2

Component Analysis of *Agastache rugosa* Extract

We tried to determine whether isoagastachoside is included in the *Agastache rugosa* extract, especially the hot water extract of *Agastache rugosa* (WEAR).

Specifically, it was analyzed under gradient elution conditions by using UHPLC-MS/MS (Dionex UltiMate 3000 UHPLC and Thermo Q-Exactive mass spectrometer); as a stationary phase, a column of Acquity BEH C18 column (100×2.1 mm, 1.7 μm); and as a mobile phase, water with 0.1% formic acid added and acetonitrile. The mass spectrometer used HESI source and analyzed in negative ion mode. Retention time, mass spectrum, m/z, and fragment were compared with isoagastachoside standard product (99%, Ensol Bio).

Figure 1:
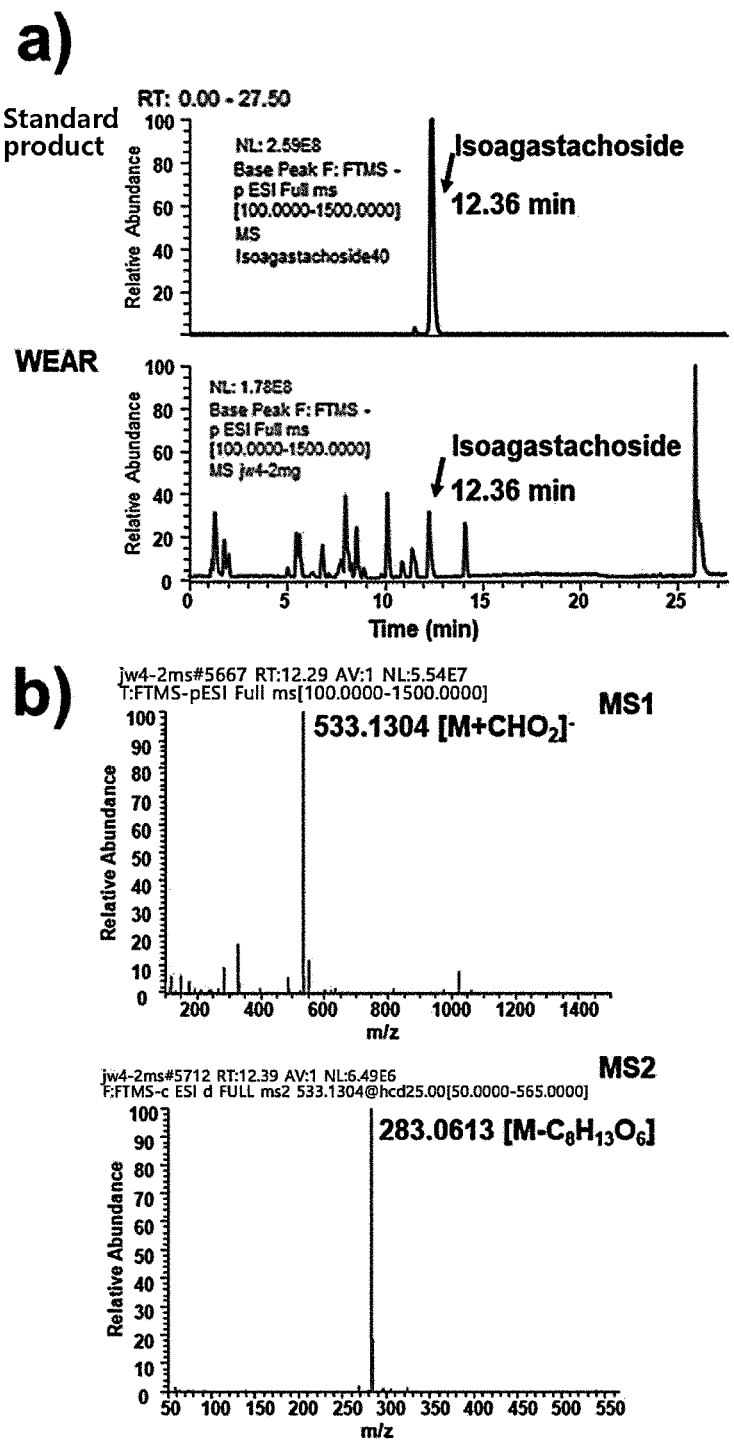
FIG. 1 shows the component analysis results of a hot water extract of *Agastache rugosa* (WEAR). It was confirmed that *Agastache rugosa*'s WEAR contained isoagastachoside component (0.2% of the weight of the WEAR).

As a result, as shown in FIG. 1 *a*), a peak of isoagastachoside was observed at a retention time of 12.36 minutes on the chromatogram of the standard product and the chromatogram of WEAR. In addition, as shown in FIG. 1 *b*), it was confirmed that isoagastachoside was contained in the hot water extract by confirming the $[M+CHO_2]^-$ form precursor ion (MS1, m/z 533.1304) and the $[M-C_8H_{13}O_6]^-$ form product ion (MS2, m/z 285.0613) on the mass spectrum of the observed peak. As a result of the quantitative test, it was confirmed that isoagastachoside was contained in the WEAR in an amount of 0.2% by weight.

Example 3

Analysis of the Effect of *Agastache rugosa* Extract on Osteoclast Differentiation

<3-1> Inhibitory Effect of *Agastache rugosa* Extract on Osteoclast Differentiation We tried to determine whether *Agastache rugosa* extract inhibits the differentiation of osteoclast progenitor cells into osteoclasts. The osteoclast progenitor cells were treated with hot water extract of *Agastache rugosa* (WEAR) and ethanol extract of *Agastache rugosa* (EEAR) by concentration, and the number of osteoclasts was analyzed accordingly.

Specifically, bone marrow cells of mice were cultured in α-MEM medium containing M-CSF (60 ng/ml) and 10% FBS for 3 days to obtain bone marrow cell-derived macrophages (BMMs), which were used as osteoclast progenitor cells. To generate osteoclasts, $1\times10^4$ pieces of the obtained BMMs were placed in per well of a 96-well plate, cultured for 4 days in a medium containing M-CSF (60 ng/ml) and RANKL (50 ng/ml), and the BMM were treated with hot water extract of *Agastache rugosa* (WEAR; 10, 33, 100, 200 μg/ml) or ethanol extract of *Agastache rugosa* (EEAR; 10, 33, 100 μg/ml) under the same culture condition. After fixing the cells with 10% formalin, TRAP (Tartrate-resistant acid phosphatase) staining was performed using naphthol AS-MS phosphate and Fast red violet LB salt, and TRAP-positive cells having three or more nuclei (osteoclasts) were counted. Data are presented as mean±standard deviation, and statistical analysis was performed using one-way ANOVA with Dunnett test, **$p<0.01$.

Figure 2:
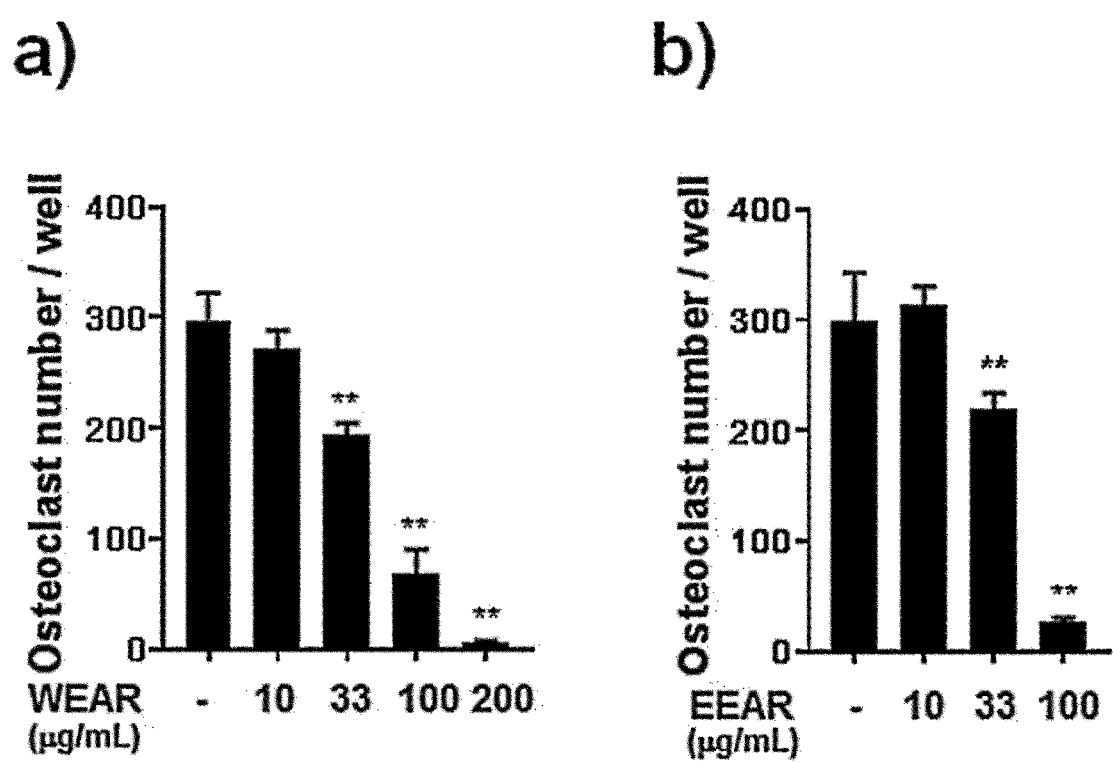
FIG. 2 shows the number of osteoclasts according to the treatment concentration when the bone marrow cell-derived macrophages are treated with a hot water extract of *Agastache rugosa* (WEAR, a)) or an ethanol extract of *Agastache rugosa* (EEAR, b)). It was confirmed that both WEAR and EEAR had the effect of significantly inhibiting the differentiation into osteoclasts.

As a result, as shown in FIG. 2 *a*), the osteoclast differentiation inhibitory effect of 35, 77, and 98% was exhibited by treatment with 33, 100, and 200 μg/ml of hot water extract of *Agastache rugosa* (WEAR), respectively. In addition, as shown in FIG. 2 *b*), the osteoclast differentiation inhibitory effect of 27% and 91% was exhibited by treatment with 33 and 100 μg/ml of ethanol extract of *Agastache rugosa* (EEAR), respectively.

<3-2> Inhibitory Effect of Components Contained in *Agastache rugosa* Extract on Osteoclast Differentiation We tried to determine whether isoagastachoside or polysaccharide fraction contained in the extract of *Agastache rugosa* inhibits the differentiation of osteoclast progenitor cells into osteoclasts.

Specifically, in the same manner as in Example <3-1>, it was assessed whether hot water extract of *Agastache rugosa* (WEAR; 5, 10 and 20 μg/ml), isoagastachoside (5 and 10 μg/ml), or the polysaccharide fraction (WEAR-PS; 3.3, 10, 33, 100, 200 μg/ml) separated from WEAR in Example <1-2> had an inhibitory effect on osteoclast differentiation. IC50 (inhibitory concentration 50), the concentration showing 50% inhibition efficiency, was calculated using Praph-Pad Prism software.

Figure 3:
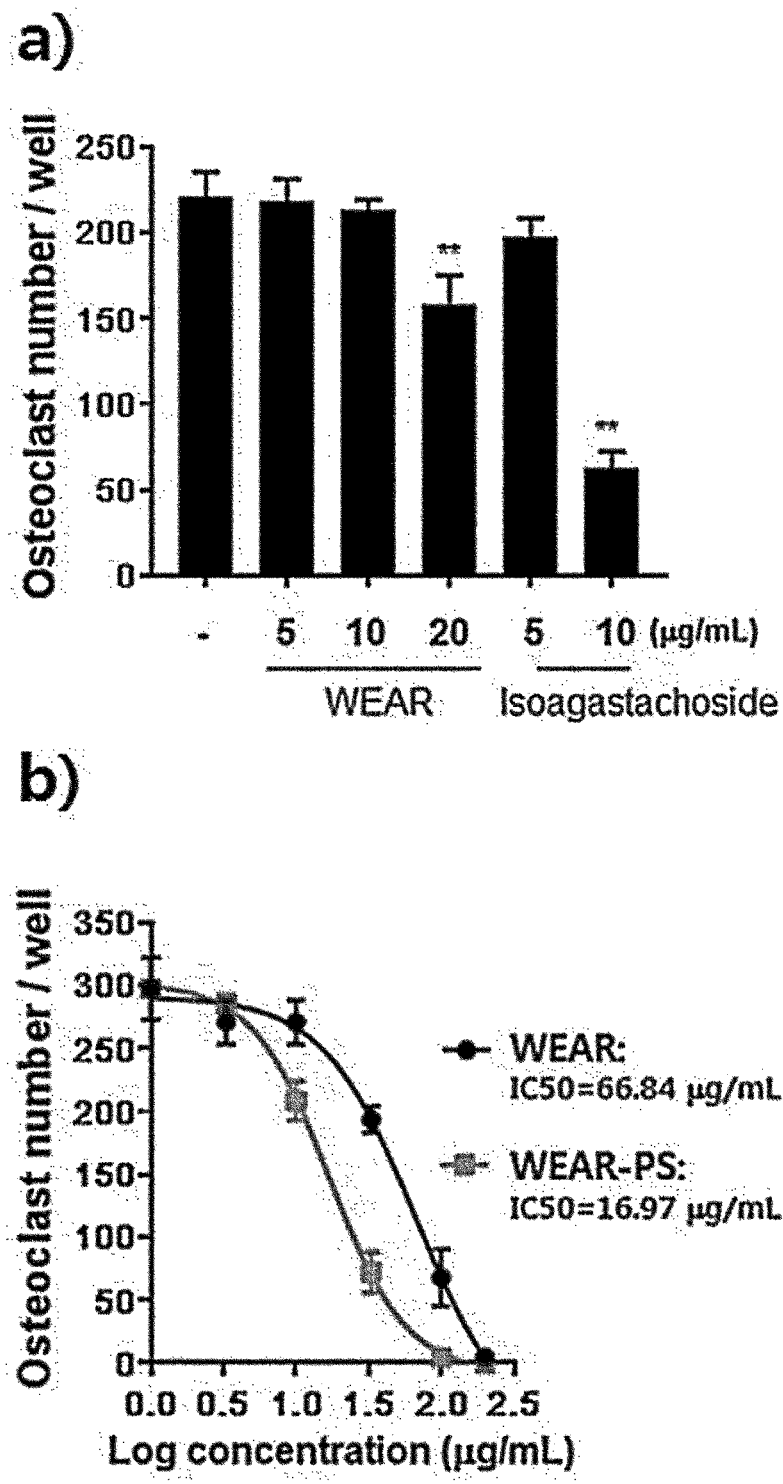
FIG. 3 shows the number of osteoclasts according to the treatment concentration when the bone marrow cell-derived macrophages are treated with a hot water extract of *Agastache rugosa* (WEAR), an isoagastachoside or a polysaccharide fraction (WEAR-PS) separated from WEAR of *Agastache rugosa*. WEAR also had the effect of inhibiting the differentiation of macrophages into osteoclasts, and isoagastachoside or WEAR-PS more significantly inhibited the differentiation into osteoclasts.

As a result, as shown in FIG. 3 *a*), it was confirmed that isoagastachoside contained in hot water extract of *Agastache rugosa* (WEAR) had the effect of inhibiting the differentiation of bone marrow cell-derived macrophages (BMM) into osteoclasts. Isoagastachoside showed a better inhibitory effect on osteoclast differentiation than WEAR at the same concentration, particularly when treated with 10 μg/ml, inhibited osteoclast differentiation very significantly compared to WEAR at the same concentration. This meant that isoagastachoside acted as an active ingredient of WEAR's osteoclast differentiation inhibitory effect.

In addition, as shown in FIG. 3 *b*), the WEAR osteoclast differentiation inhibitory 1050 value was 66.84 μg/ml, whereas the WEAR-PS 1050 value was 16.97 μg/ml, indicating that the inhibitory effect of WEAR-PS on osteoclast differentiation was about 4 times more effective. This meant that WEAR-PS acted as an active ingredient of WEAR's osteoclast differentiation inhibitory effect.

<3-3> Analysis of (Crude) Polysaccharide Fractions Contained in *Agastache rugosa* Extract In Example <3-2>, since it was confirmed that the polysaccharide fraction contained in the hot water extract of *Agastache rugosa* (WEAR) had an osteoclast differentiation inhibitory effect, we specifically wanted to confirm the molecular weight of the polysaccharide fraction exhibiting the osteoclast differentiation inhibitory effect.

Specifically, WEAR-PO, WEAR-ED, P0-3 kDA Fx, P0-10 kDA Fx, P0-30 kDA Fx, P0-100 kDA Fx, P0-300 kDA Fx and P0-1000 kDA Fx separated in Example <1-2> and WEAR were treated at concentrations of 10, 33, 100, and 200 μg/ml, respectively, and the osteoclast differentiation inhibitory effect was assessed in the same manner as in Example <3-1>.

Figure 4:
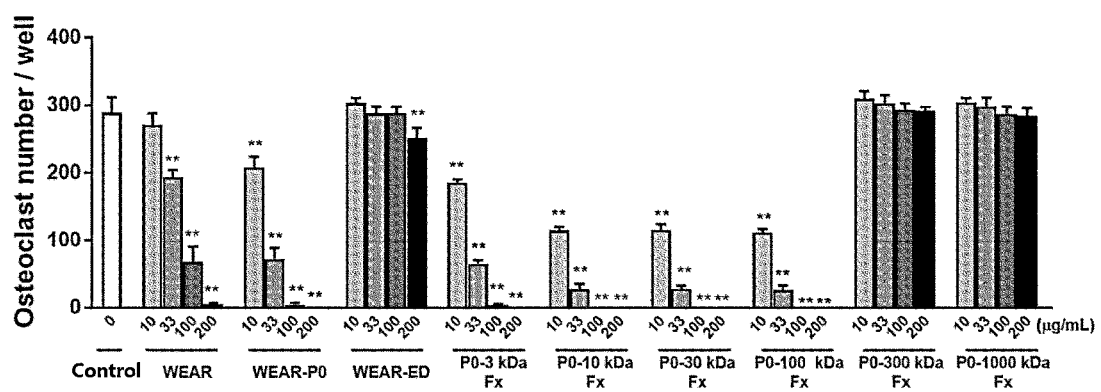
FIG. 4 shows the number of osteoclasts according to the treatment concentration, when ethanol precipitation is performed on the hot water extract of *Agastache rugosa* (WEAR) and the bone marrow cell-derived macrophages are treated with the precipitated crude polysaccharide fraction (WEAR-PO), the non-precipitated fraction (WEAR-ED) or crude polysaccharide fractions obtained by separating WEAR-PO by molecular weight cut-off (P0-3 kDA Fx, P0-10 kDA Fx, P0-30 kDA Fx, P0-100 kDA Fx, P0-300 kDA Fx, P0-1000 kDA Fx). WEAR-ED, P0-300 kDA Fx or P0-1000 kDA Fx fractions were confirmed to have insignificant inhibitory effect on osteoclast differentiation.

As a result, as shown in FIG. 4, it was confirmed that WEAR-PO had a superior osteoclast differentiation inhibitory effect compared to WEAR, and WEAR-ED had a significantly reduced osteoclast differentiation inhibitory effect compared to WEAR or WEAR-P0. In addition, among the crude polysaccharide fractions of WEAR, P0-3 kDA Fx, P0-10 kDA Fx, P0-30 kDA Fx and P0-100 kDA Fx showed excellent osteoclast differentiation inhibitory effects, especially the effects of P0-10 kDA Fx, P0-30 kDA Fx and P0-100 kDA Fx were significantly superior. On the other hand, P0-300 kDA Fx and P0-1000 kDA Fx did not show osteoclast differentiation inhibitory effect.

Example 4

Analysis of the Effect of *Agastache rugosa* Extract on Cell Survival

We tried to determine whether *Agastache rugosa* extract or isoagastachoside contained therein inhibits the survival of osteoclast progenitor cells.

Specifically, $1.2\times10^4$ pieces of bone marrow cell-derived macrophages (BMMs) were placed in per well of a 96-well plate, and then cultured for 2 days in a medium containing M-CSF (60 ng/mℓ) in which hot water extract of *Agastache rugosa* extract (WEAR; 5, 10, 20, 33, 100 and 200 μg/ml), ethanol extract of *Agastache rugosa* (EEAR; 10, 33 and 100 μg/ml) or isoagastachoside (5 and 10 μg/ml) samples were added. Cell viability was determined by measuring absorbance at 450 nm using Cell counting Kit-8 (CCK-8, Dojindo Inc.), percentage of untreated controls and data are presented as mean±standard deviation, and statistical analysis was performed using one-way ANOVA with Dunnett test, **$p<0.01$.

Figure 5:
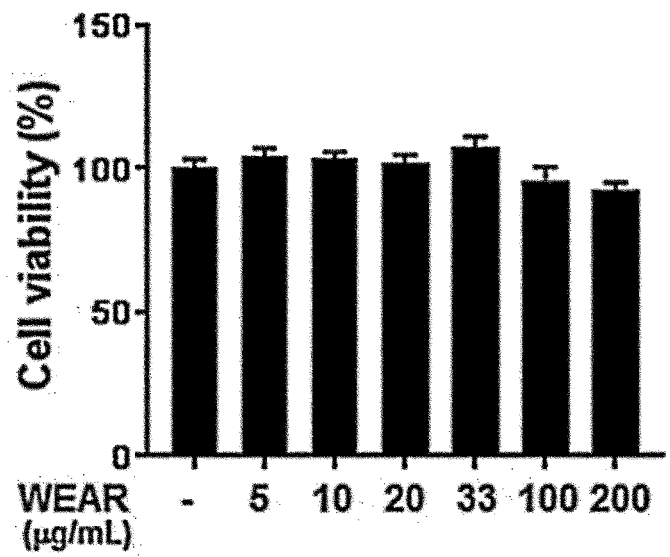
FIG. 5 shows the viability of bone marrow cell-derived macrophages (progenitor cells of osteoclasts) according to the treatment concentration when the bone marrow cell-derived macrophages are treated with a hot water extract of *Agastache rugosa* (WEAR, a)), an ethanol extract of *Agastache rugosa* (EEAR, b)) or isoagastachoside (c)). WEAR or isoagastachoside did not affect the viability of osteoclast progenitor cells, and it was confirmed that EEAR had an effect of inhibiting the survival of osteoclast progenitor cells when it was 100 μg/ml or more.
Figure 5:
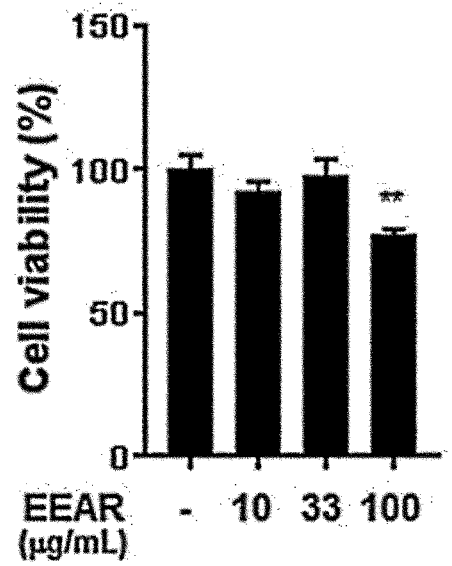
Figure 5:
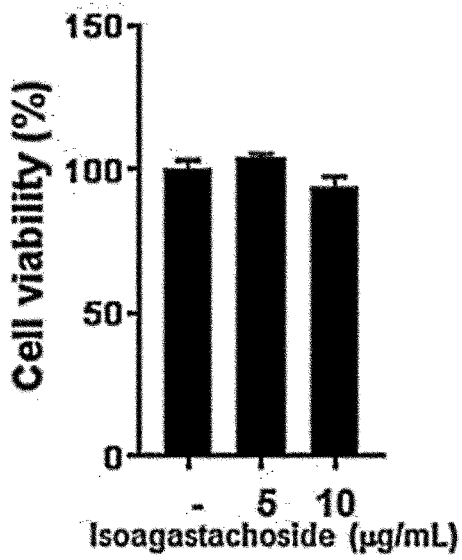

As a result, there was no effect in cell survival when treated with WEAR or isoagastachoside (a) and c) of FIG. 5). On the other hand, in the case of *Agastache rugosa* ethanol extract (EEAR), there was no difference in cell survival even when treated with concentrations of 10 and 33

μg/ml, but cell survival was reduced by 23% when treated with concentrations of 100 μg/ml (FIG. 5 b)).

Example 5

Analysis of the Effect of *Agastache rugosa* Hot Water Extract on Osteoclast Bone Resorption Capacity We tried to determine the effect of *Agastache rugosa* hot water extract (WEAR) on the bone resorption function of osteoclasts.

Specifically, $2 \times 10^4$ pieces of bone marrow cell-derived macrophages (BMMs) of Example 4 were placed in per well of a mineral-coated 96-well plate (Osteo Assy Surface, corning, NY, USA), and then were cultured for 4 days in a medium containing M-CSF (60 ng/ml) and RANKL (100 ng/ml). In the same culture conditions, BMMs were treated with the concentrations (33, 100, 200 μg/ml) of hot water extract of *Agastache rugosa* (WEAR). The mineral pit (resorption pit) resorbed by the osteoclasts was expressed as mean±standard deviation by removing the osteoclasts using clorox, then taking a photomicrograph and analyzing the resorption area using image J software, and statistical analysis was performed using one-way ANOVA with Dunnett test, *p<0.05 and **p<0.01.

Figure 6:
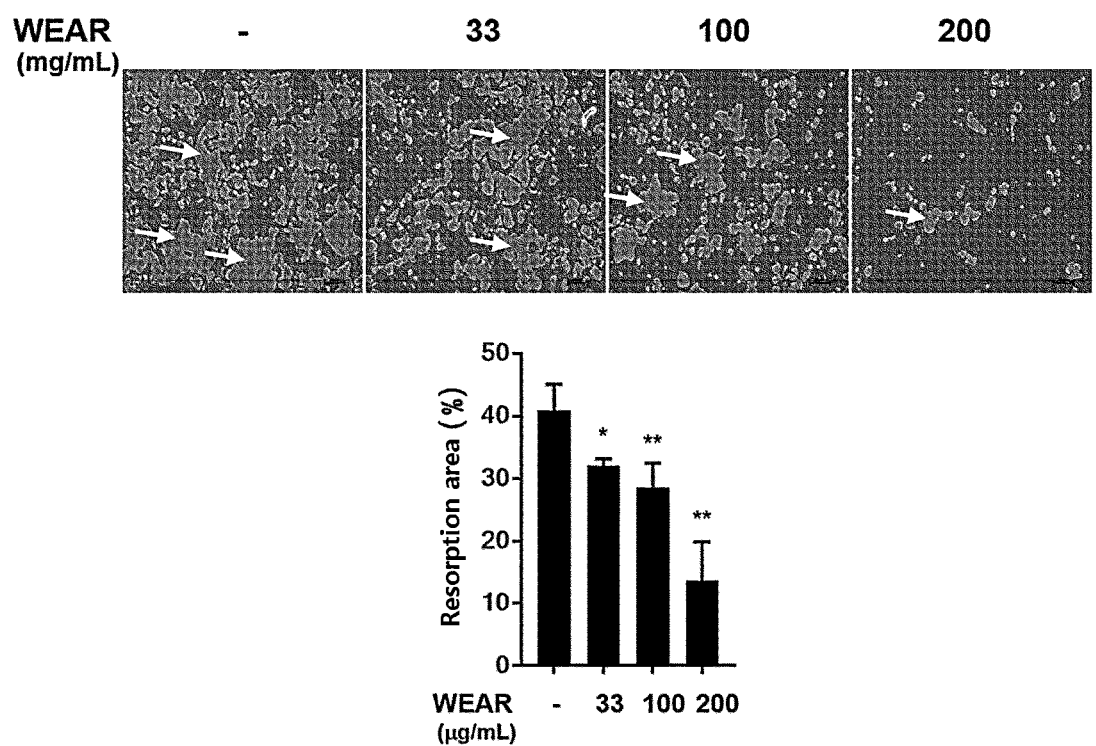
FIG. 6 shows an image of mineral pit resorbed by osteoclasts and a resorption area according to the treatment concentration of the hot water extract of *Agastache rugosa* (WEAR). It was confirmed that as the concentration of the treated WEAR increased, the bone resorption capacity of osteoclasts was inhibited and the area of the mineral pit decreased.

As a result, as shown in FIG. 6, when hot water extract of *Agastache rugosa* (WEAR) was treated at concentrations of 33, 100 and 200 μg/ml, compared to the control group, the bone resorption function exhibited 21, 30 and 67% inhibitory effects, respectively.

Example 6

Analysis of the Effect of *Agastache rugosa* Hot Water Extract on Osteoblasts

Mineralization according to the differentiation of osteoblasts was measured to determine whether *Agastache rugosa* hot water extract (WEAR) affects the differentiation of osteoblasts other than osteoclasts.

Specifically, $1.7 \times 10^4$ pieces of D1 ORL UVA cells (ATCC, USA), which are mouse bone marrow stromal cells, were placed in per well of a 96-well plate and then cultured for 2 days in a DMEM medium containing 10% FBS. Then, ascorbic acid (50 μg/ml), beta-glycerophosphate (5 mM) and *Agastache rugosa* extract hot water extract (WEAR; 0, 10, 33, 100 and 200 μg/ml) were added to an α-MEM medium containing 10% FBS and cultured for 8 days. Mineralization according to osteoblast differentiation after cell fixation was identified by Alizarin Res S staining, and for comparison of mineralization, the absorbance was measured after extraction of the stained Alizarin Red S with 10% acetic acid.

Figure 7:
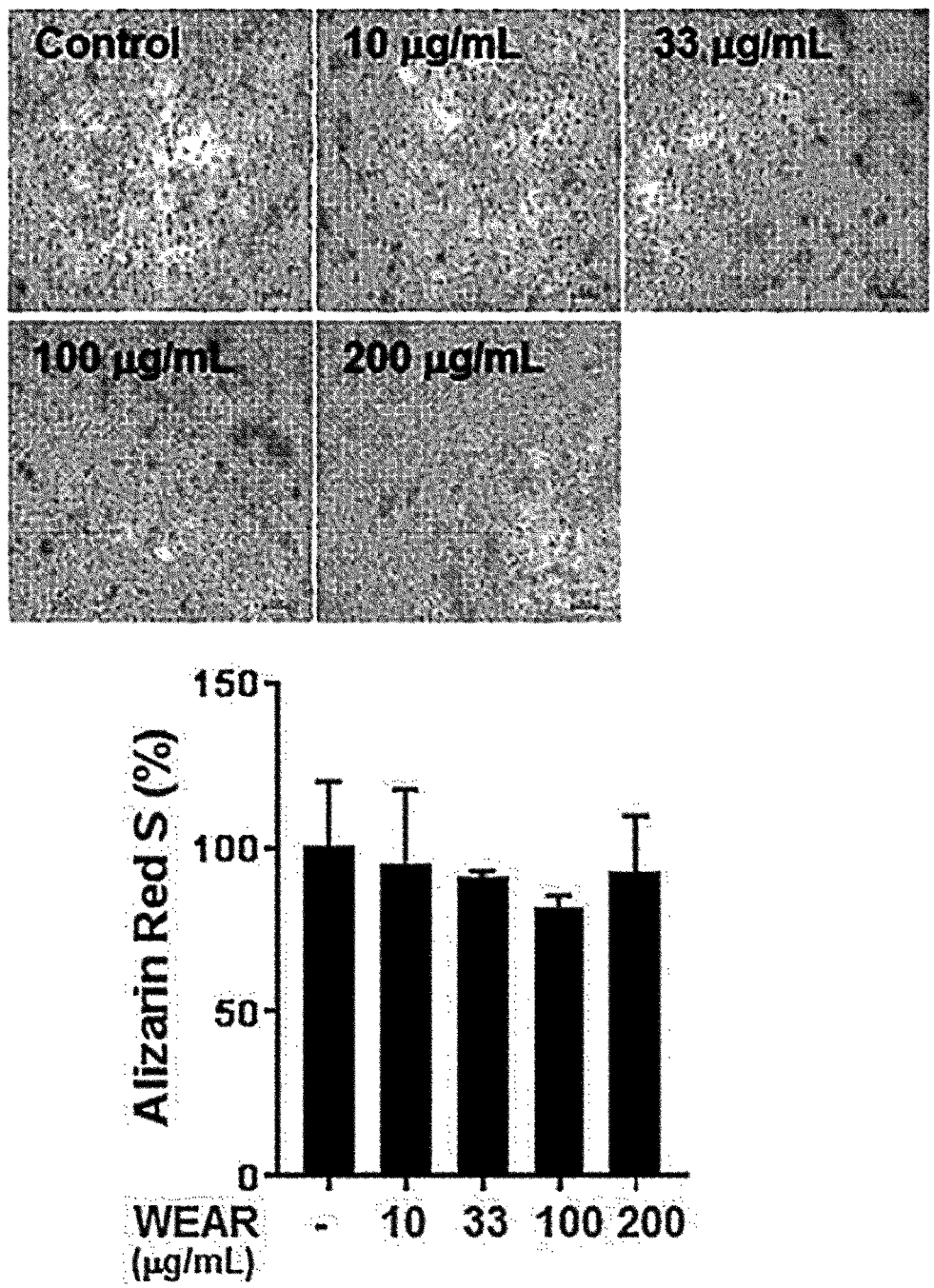
FIG. 7 shows the differentiation of osteoblasts according to the treatment concentration of hot water extract of *Agastache rugosa* (WEAR). It was confirmed that WEAR did not affect the differentiation of osteoblasts.

As a result, as shown in FIG. 7, it was confirmed that WEAR did not affect the differentiation of osteoblasts.

Example 7

Analysis of the Effect of *Agastache rugosa* Hot Water Extract on an Ovariectomized Mouse Model To determine whether the bone loss-related effects of *Agastache rugosa* extract (WEAR) were related to estrogen, body weight, uterine weight, bone volume, trabecular bone thickness, and trabecular bone count were measured in an ovariectomized mouse model treated with WEAR.

Specifically, 30 6-week-old female C57BL/6J mice (Central Experimental Animal, Seoul) were acclimatized for 1 week, and bilateral ovariectomy (OVX, 30 mice) and sham surgery (Sham, 10 mice) were performed on the 7-week-old mice. After 1 week, feed (Saron Bio, D12492) containing 60% kcal fat was freely ingested, and 0.2 g (5 mice) and 0.6 g (5 mice) of *Agastache rugosa* hot water extract (WEAR) dissolved in sterile distilled water per kg of mouse was orally administered once daily for 4 weeks. Sterile distilled water was orally administered once daily for 4 weeks to the sham surgery group (Sham, 10 mice) and bilateral ovariectomy control group (10 mice). Changes in body weight of mice between 1 week and 5 weeks after OVX were measured, and the weight after hysterectomy through autopsy after 5 weeks of OVX were measured. In addition, after autopsy of the mouse, the thigh bone was removed and fixed with 10% neutral formalin. After micro-computed tomography (Quantum GX, Perkin Elmer, USA) of the thigh bone, the amount and structure of trabecular bone were analyzed (DataViewer software version 1.4.3.2, SkyScan). Data are presented as mean±standard error, and statistical analysis was performed using one-way ANOVA with Dunnett test, **p<0.01.

Figure 8:
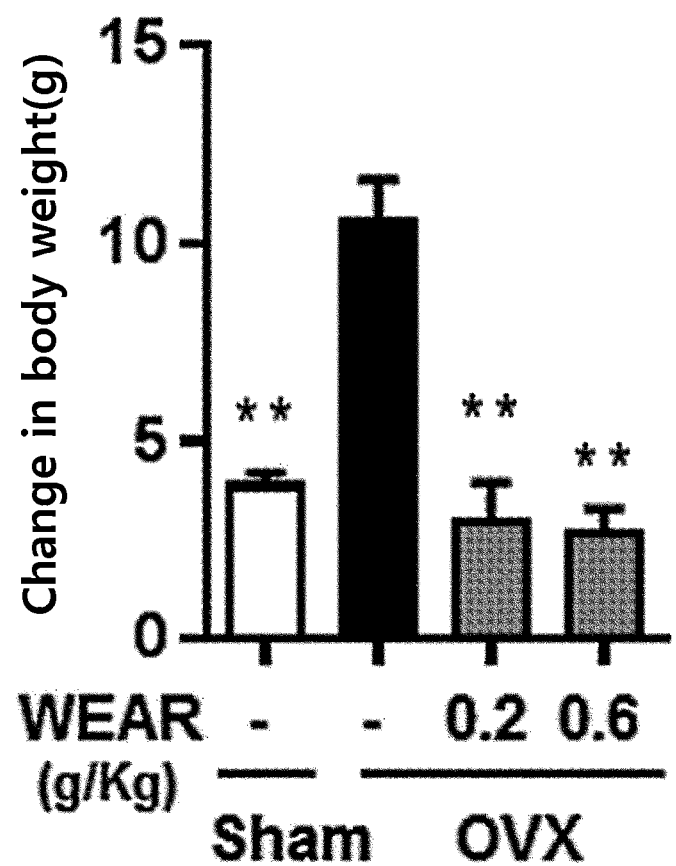
FIG. 8 shows changes in body weight after oral administration of hot water extract of *Agastache rugosa* (WEAR) to an ovariectomized (OVX) mouse model. It was confirmed that WEAR had the effect of inhibiting the weight change in the ovariectomized mouse model.

As a result, as shown in FIG. 8, it was confirmed that among the ovariectomy group (OVX) the control group not treated with *Agastache rugosa* hot water extract (WEAR) had an increase in body weight compared to the Sham group, and it was confirmed that when WEAR was administered at 0.2 g/kg or 0.6 g/kg, respectively, weight gain due to ovariectomy was significantly inhibited.

Figure 9:
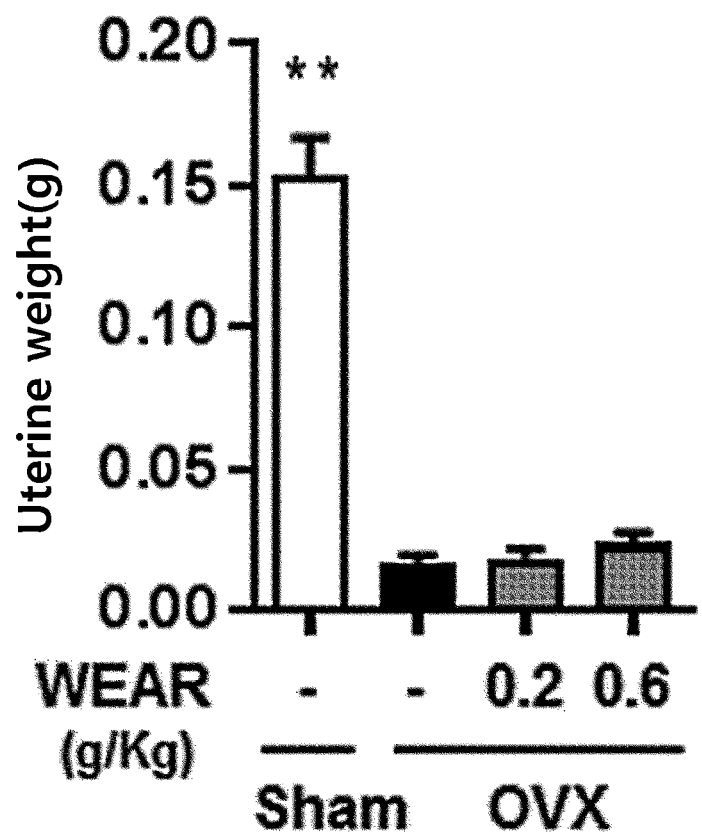
FIG. 9 shows changes in uterine weight after oral administration of hot water extract of *Agastache rugosa* (WEAR) to an ovariectomized (OVX) mouse model. It was confirmed that WEAR did not affect the uterine weight in the ovariectomized mouse model.

In addition, as shown in FIG. 9, it was confirmed that the ovariectomy group (OVX) had reduced uterine weight due to uterine atrophy by ovariectomy compared to the Sham group, and administration of *Agastache rugosa* hot water extract (WEAR) did not affect the ovariectomy-induced uterine atrophy.

Figure 10:
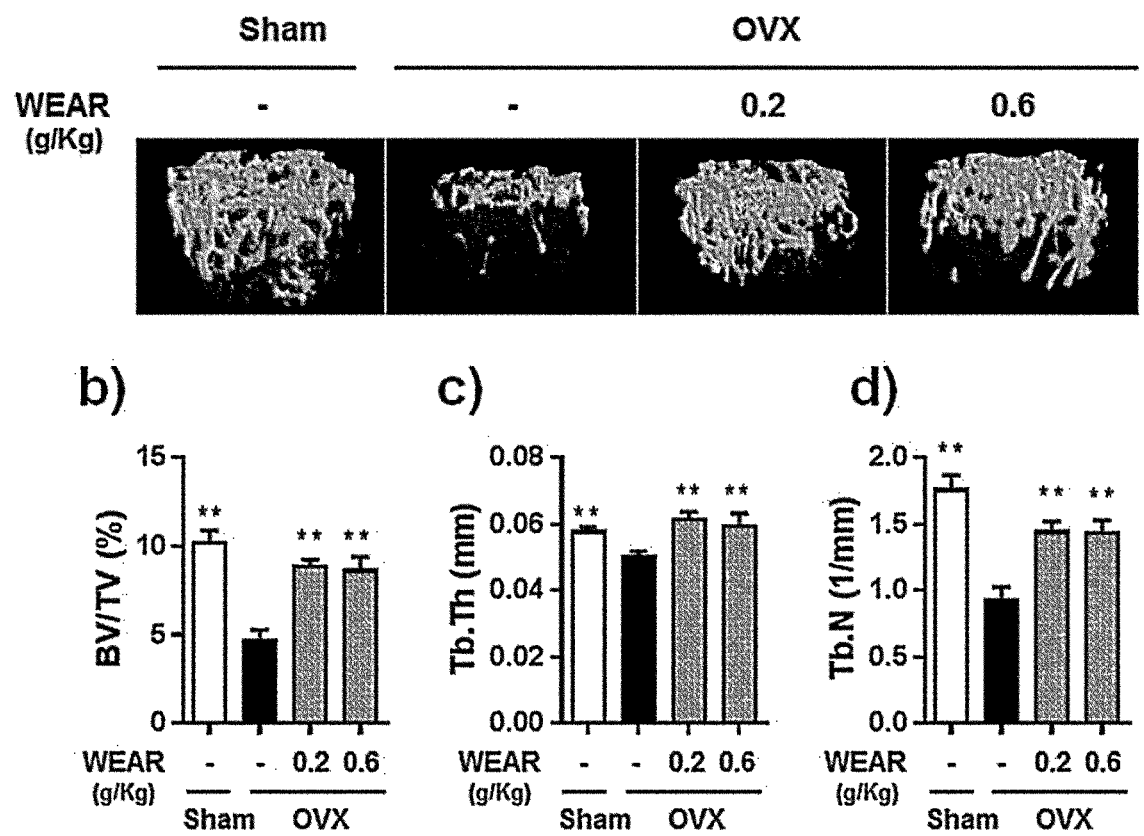
FIG. 10 respectively shows computed tomography 3D images of trabecular bone of the thigh bone (a)), changes in bone volume (BV/TV, b)), changes in trabecular bone thickness (Tb.Th, c)), and changes in trabecular bone count (Tb.N, d)) after oral administration of hot water extract of *Agastache rugosa* (WEAR) to an ovariectomized (OVX) mouse model. It was confirmed that WEAR had the effect of suppressing the decrease in bone volume, trabecular bone thickness, and trabecular bone number in the ovariectomized mouse model.

FIG. 10 a) is computed tomography 3D images of trabecular bone of the thigh bone in each experimental group; FIG. 10 b) is a graph showing bone volume (BV/TV, %); FIG. 10 c) is a graph showing trabecular bone thickness (Tb.Th, mm); and FIG. 10 d) is a graph showing trabecular bone count (Tb.N, 1/mm). Bone volume, trabecular bone thickness, and trabecular bone count were decreased in the ovariectomy (OVX) group compared to the Sham group, and administration of 0.2 g/kg and 0.6 g/kg of *Agastache rugosa* hot water extract (WEAR) significantly inhibited the decrease in bone volume, trabecular bone thickness, and trabecular bone count following ovariectomy (OVX).

INDUSTRIAL APPLICABILITY

The *Agastache rugosa* extract or the isoagastachoside or crude polysaccharide fraction included in the extract according to the present invention can be prepared based on plants being domestically cultivated, and thus is advantageous in terms of time and cost, and can effectively inhibit the differentiation, growth, and bone resorption functions of osteoclast progenitor cells, thus increasing bone density and the like, and accordingly, can be effectively used for the prevention, amelioration, or treatment of diseases related to bone loss caused by differentiation into osteoclasts or excessive activity of osteoclasts. In addition, the active ingredient, which is a plant-derived natural substance, is safe due to fewer side effects on the human body compared to chemical drugs, and has the effect of inhibiting osteoclast progenitor cells independently of estrogen, and thus can be widely used in osteoporosis occurring due to various causes other than menopause, so it has great industrial applicability.

What is claimed is:

1. A method for treating diseases related to bone loss caused by osteoclasts, the method comprising administering an isoagastachoside or crude polysaccharide fraction contained in *Agastache rugosa* water extract to a patient with a disease related to bone loss caused by osteoclasts,
   wherein the *Agastache rugosa* extract is extracted by reflux extraction method.

2. The method of claim 1, wherein the *Agastache rugosa* extract is extracted from any one or more selected from the group consisting of leaves, stems, flowers and fruits of *Agastache rugosa*.

3. The method of claim 1, wherein the molecular weight of the crude polysaccharide fraction is 1 to 300 kDa.

4. The method of claim 1, wherein the administering inhibits the differentiation into osteoclasts or the activity of osteoclasts.

5. The method of claim 1, wherein the disease related to bone loss is any one or more selected from the group consisting of osteoporosis, Pajet's disease of bone, rickets, osteomalacia, renal osteodystrophy in patients with renal failure, rheumatoid bone disease, degenerative bone disease, bone metastatic lesion, and a primary bone tumor.

\* \* \* \* \*